Aug. 11, 1959    R. W. WIRTZ ET AL    2,898,828
MECHANICAL INDEXING APPARATUS FOR PHOTOCOMPOSING MACHINE
Filed June 24, 1958    8 Sheets-Sheet 1

INVENTORS
Robert W. Wirtz
Harold B. Ratcliff
John S. Turner, Jr.
By: Kegan and Kegan Attys Aug. 11, 1959    R. W. WIRTZ ET AL    2,898,828
MECHANICAL INDEXING APPARATUS FOR PHOTOCOMPOSING MACHINE
Filed June 24, 1958    8 Sheets-Sheet 5

INVENTORS
Robert W. Wirtz
Harold B. Ratcliff
John S. Turner, Jr.
By: Kegan and Kegan Attys.

INVENTORS
Robert W. Wirtz
Harold B. Ratcliff
John S. Turner, Jr.
By: Kegan and Kegan Attys.

Fig. 23.

2,898,828
Patented Aug. 11, 1959

2,898,828

MECHANICAL INDEXING APPARATUS FOR PHOTOCOMPOSING MACHINE

Robert W. Wirtz, Watchung, N.J., Harold E. Ratcliff, Peoria, Ill., and John S. Turner, Jr., Fort Worth, Tex., assignors to Wirtz Company, Watchung, N.J., a copartnership Application June 24, 1958, Serial No. 744,291

31 Claims. (Cl. 95—4.5)

This invention relates to the art of printing and to automatic means for positioning a font of characters corresponding to the characters selectable by the operation of the keys of a keyboard. More particularly this invention relates to a mechanical indexing means actuatable by the keys of a standard typewriter to position selected exposure characters for photographing. This application is a continuation-in-part of application Serial No. 518,712, filed June 29, 1955, now abandoned.

Known machines for automatically indexing type fonts to reproduce printed matter leave much to be desired. Their high original and operating costs, coupled with the special skills needed for their upkeep and operation, prevent their universal use. Moreover, they generally lack the requirements of high speed operation, flexibility and accuracy needed in order to meet professional standards for producing text material.

It is therefore an object of this invention to overcome these and other objectional features of known machines and to provide automatic indexing apparatus capable of fulfilling the requirements of speed, precision and accuracy of operation.

Another object of this invention is to combine the relative simplicity of typewriting with the regularity of professional printed composition by providing automatic indexing means which is actuated each time a typewriter key is operated to thereby position a movable character font or matrix for reproduction of the character corresponding to the operated key.

A further object of this invention is to provide an automatic mechanical indexing mechanism which may be employed with a photocomposing machine to position the photographic matrix therein for photographing selected characters. It is a specific object and feature of the invention that the indexing means so provided is adaptable for use in existing typewriters or as original equipment in new typewriters. Operation of the typewriter as the pilot machine not only actuates the indexing mechanism but further controls the operation of the photocomposing machine for photographing the selected characters.

Still another object of this invention is to provide automatic indexing apparatus which need not return to a neutral or "home" position after each character selection and reproduction, thereby permitting more rapid operation. To this end, another specific feature of the invention is the provision of a novel compensator which assures accurate indexing of the character matrix for positioning the desired character at a character-reproducing area.

Also, an object of this invention is to provide a novel arrangement of typewriter key actuated stop pins for controlling the travel of a shuttle which moves to position the character matrix for reproducing the character corresponding to an operated typewriter key.

It is a further object of this invention to provide a character font or matrix having characters thereon corresponding to the characters selectable on the keys of a typewriter, and to arrange the characters in a novel way corresponding to the order in which the movable shuttle is controlled by the key actuated stop arms.

A more specific object of this invention is the provision of means whereby the aforementioned moving shuttle need move at the most only a fractional part of the length across the typewriter keyboard each time a typewriter key is operated, thereby facilitating rapid reproduction of the text material being reproduced.

Other detailed objects of this invention are the provision of positive locking apparatus for retaining a character matrix in accurate alignment with a character-reproducing station, and the provision of a simple shift mechanism for shifting the character font to reproduce either upper case or lower case characters.

An essential feature of this invention is to provide means for assuring completion of the character reproduction operation, even though the operated character selecting key is released prior to completion. Also, if a key is held in operative position over an extended time, repeat reproduction of a selected character is prevented.

The instant invention may be employed with apparatus capable of producing proportionally spaced and/or justified text material, such as that disclosed in our copending patent application, Serial No. 502,028, filed April 18, 1955, and, as will be obvious to persons skilled in the art, it may be employed to index any machine having a movable character bearing font. Moreover, the pilot machine herein disclosed affords visual inspection of the text being photographically produced, enabling an operator at all times to proofread a copy of that which is photographed.

Briefly, the instant embodiment of the invention includes, as described in the following exposition and illustrated in the accompanying drawings, a movable photographic matrix or font with characters thereon corresponding to the character keys in the pilot machine, preferably a typewriter. To selectively position the matrix, a movable reading shuttle is provided, with the shuttle having a plurality of stop members or abutments thereon. A stop pin is connected with each character key of the pilot machine and is utilized to stop travel by the reading shuttle. The stop pins are arranged in a plurality of banks corresponding to the stops on the reading shuttle. When a character key is depressed, its respective stop pin is moved to complete an electrical circuit to one of two field windings in a reversible motor. The motor, in turn, drives the shuttle, and the stop abutment thereon corresponding to the pin bank in which the lowered pin is located, toward the stop pin. Contact between the stop pin and the respective shuttle stop element brings the shuttle movement to an end.

Between the character matrix and the reading shuttle, a mechanical motion transmitting train is provided to move the matrix and to position the exposure character thereon corresponding to the depressed character key at an exposure area. The motion transmitting train includes a unique device which compensates for the thickness of the shuttle stop element and of the stop pin which it abuts, so that the selected exposure character is accurately positioned at the exposure station regardless of the direction from which the shuttle stop element approaches the stop pin.

Juxtaposed to the character segment are a plurality of locking devices, usually solenoids, corresponding to the plurality of stop elements on the reading shuttle. After the segment is approximately positioned by the reading shuttle, the locking solenoid corresponding to the shuttle stop abutting the actuated stop pin is energized. This causes the solenoid plunger to move so that an arm thereon engages a V-shaped locking slot to lock the matrix accurately in place for photographing the selected character. Once the selected character is accurately locked in position, a shutter control device trips the shutter to complete the exposure of the selected character.

To enable either upper-case or lower-case characters to be photographed, a character matrix shift mechanism is provided to move the font with respect to the exposure area. Depression of the typewriter shift key causes the matrix to move so that upper-case characters provided thereon may be selectively positioned for photographing. Release of the shift key returns the matrix to its original position wherein lowercase characters may be positioned for photographing.

A synchronizing mechanism, operatively connected with the typewriter keys, is provided to retain any actuated key in its depressed position until completion of the photographic cycle. The synchronizing mechanism further prevents operation of any other typewriter character key during this period so that a subsequent character selection can be made only after the shutter is tripped and the positioned character is photographed.

The foregoing and other objects, advantages and features of construction are described hereinafter in detail in conjunction with the accompanying drawings.

*Keyboard reader*

Figure 1:
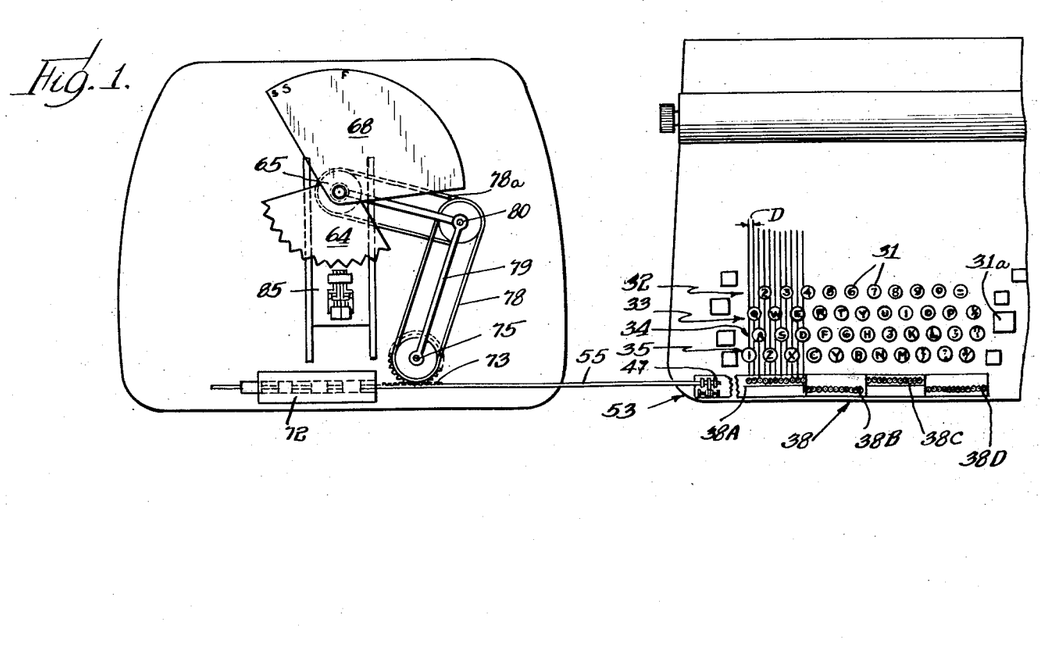
Figure 1 is a plan view of the invention, showing only those parts which are used to control positioning of the character matrix.
Figure 2:
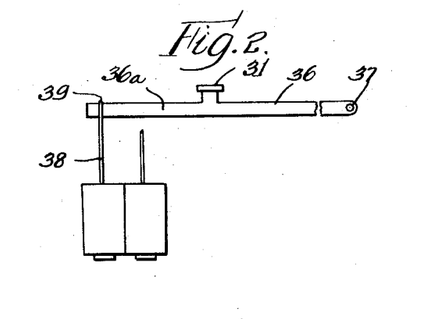
Figure 2 is a side elevation view of a keyboard key, showing the stop pin connection thereto.

As generally illustrated in Fig. 1, a standard typewriter and keyboard is used for actuating the indexing apparatus. The keys 31 are aligned in four rows 32, 33, 34 and 35, each row generally comprising eleven keys. In the illustrated keyboard, forty-four keys are shown. Additional character keys, however, may be provided on the keyboard as they are needed, and it is within the contemplation of this invention also to allow these additional keys to operate the photocomposing apparatus. Assuming, however, for the purpose of this description that the key for the numeral 1 is the character key on the extreme left hand side of the keyboard, the characters, reading from left to right on the keyboard, fall into the following order: 1, Q, A, 2, Z, W, S, 3, etc. It thus becomes evident that the sequence of letters, reading from left to right, can be read by the rows in which the characters are formed; namely, row 35, row 33, row 34, row 32.

The center-to-center distance D between keys on a conventional typewriter has been standardized at $\tfrac{3}{16}$ of an inch. Therefore, the distance across the keyboard of a standard typewriter approximates $\tfrac{3}{16}$ of an inch multiplied by 4, which gives the distance between adjacent keys in the same row, multiplied by 10 (the number of spaces between adjacent keys in a row of eleven keys), or 7½ inches. Actually, the distance is even greater since additional character keys are provided in rows other than the row having the extreme left-hand character key, so that the distance more closely approximates 8 inches. In the illustrated machine there are three additional keys to the right of the last key in row 35 so that the keyboard breadth is 7½ inches, plus $\tfrac{9}{16}$ inch, or $8\tfrac{1}{16}$ inches. Thus, if a reading device or shuttle were used which moved completely across the keyboard each time character keys at the extremities of the keyboard were actuated in sequence, the shuttle would either have to move at an excessive speed to travel the full length of the standard 8 inch keyboard or the typing operation necessarily would have to be relatively slow. In order to overcome this difficulty, a novel keyboard reading device is provided whereby a single shuttle moves at the most approximately 2 inches each time any one of the character keys 31 is depressed.

Referring to Figures 2 to 5, it is seen that each character key 31 is mounted on the end of a respective key lever 36 which is pivoted, as indicated at 37, when pressure is put on the key 31. Upon an extension 36a of each lever, a pin 38 is mounted, the upper end of the pin being formed into a loop 39 which permits lever 36 to move relative to the pin after the pin is moved downwardly a short distance. Extensions 36a may be provided either as original equipment and integral with the key levers 36, or as additional parts which are attachable to the key levers of existing keyboards.

The center-to-center distances between adjacent pins is equal to the center-to-center distance D between adjacent keys 31; in a standard typewriter, this is $\tfrac{3}{16}$ of an inch. The pins, however, are staggered so that the first bank of pins, reading from left to right, is positioned to the rear of the next bank of pins by approximately ½ inch. The next bank of pins is aligned with the first bank of pins, while the fourth bank of pins is aligned with the second set of pins. The pins thus are so arranged as to be $\tfrac{3}{16}$ of an inch apart and are formed into pin banks 38, individually designated 38A, 38B, 38C, and 38D, with the banks comprising generally eleven pins each, and staggered so that banks 38A and 38C are aligned with each other while banks 38E and 38D are similarly aligned. As stated above, forty-four keys are in the keyboard shown in Fig. 1. It is understood, of course, that where a greater or lesser number of keys and characters are employed, the banks of pins are correspondingly arranged so as to accommodate the changes.

The bottom of each pin constitutes a stop which can be moved or lowered by actuating the key from which the pin depends so that the pin may oppose a stop pad on a reading shuttle. The pins are passed through pin guide blocks 38', individually labeled 38A', 38B', 38C' and 38D', with each guide block being located directly below a corresponding bank of pins, so that the blocks serve to guide the pins in their downward movement. Concentrically mounted on each pin, adjacent its bottom end, is a spring 40 held thereon between a collar 43 and the inner wall 41 of the hole 42 through which the pin passes. Each spring 40 is compressed, when the respective lever 36 is in its inoperative position, to give a slight downward bias to the pin. This spring bias, however, is not sufficient to pull the key lever 36 down but merely serves to hold a pin down once its respective key is actuated. Upon actuation of a key 31, the pin 38 connected therewith is permitted to move downwardly until it contacts either a reading shuttle or a rail, as described hereinafter, and thereafter it ceases to move downwardly. At this point, the lever 36 of the actuated key continues to move downwardly for its full stroke, moving freely in the loop 39 provided at the upper end of the pin.

Figure 3:
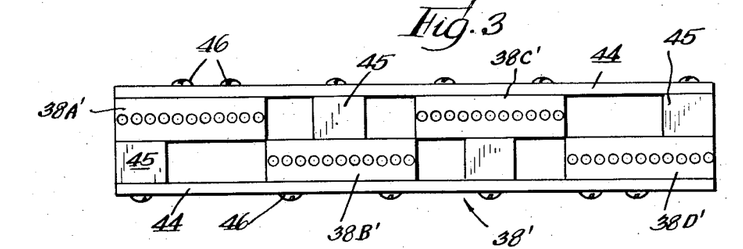
Figure 3 is a plan view of the guide means for the stop pins.

As shown in Fig. 3, the pin guide blocks 38A', 38B', 38C', and 38D' are rigidly mounted with respect to one another by means of a plurality of mounting bars 44—44 and spacing blocks 45 which serve to stagger the blocks 38A'–38D' in their respective aligned positions. Conventional means such as the bolts 46 hold the pin blocks, mounting bars and spacer blocks 45 together as an integral unit. It is further understood, of course, that any change in the number of pins necessitates a corresponding change in the pin guide blocks in order that the pins may be properly lowered through their holes 42 and into their respective stop positions.

Figure 4:
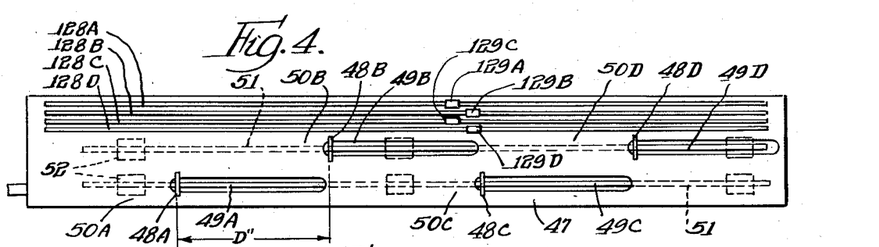
Figure 4 is a plan view of the reading shuttle.
Figure 5:
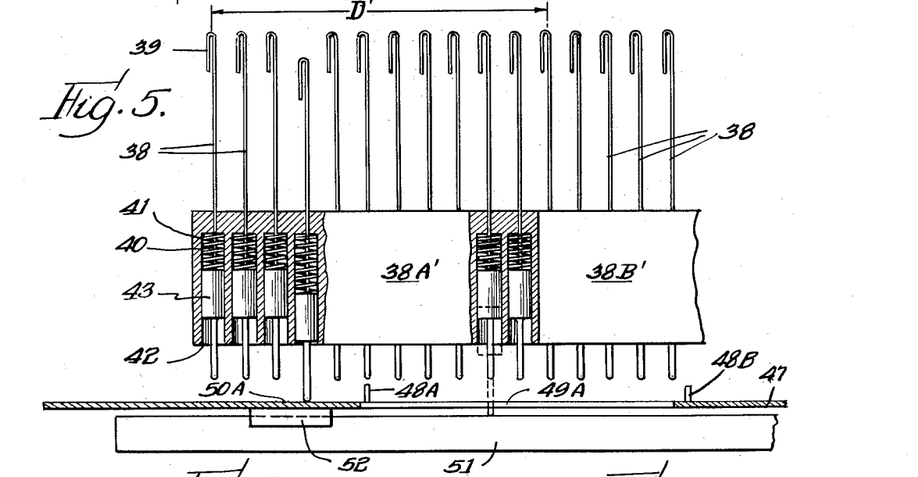
Figure 5 is a fragmentary front elevational view of the apparatus shown in Figures 3 and 4, and illustrates a guide rail for the reading shuttle and a portion of the pin guide means, with pins therein, in cross-section.

The reading shuttle 47, shown in Figs. 4 and 5, is positioned immediately below the pin assembly. Four stop pads 48, individually designated as 48A, 48B, 48C and 48D, are provided on the reading shuttle 47, one stop pad being provided for each pin bank. A critical distance is maintained between successive stop pads as hereinafter described. To the right of each stop pad 48 a slot 49 is provided in the shuttle 47. These slots, individually designated 49A, 49B, 49C and 49D, are in staggered relationship, as are the stop pads, corresponding to the staggered arrangement of the pin banks 30. Each slot 49 has a length approximately equal to the distance between successive stop pads. To the left of each stop pad 48, as viewed in Fig. 4, there is a shuttle surface area 50, the areas 50 being individually designated 50A, 50B, 50C and 50D, each surface area 50 is engageable by the pins 38 in the pin bank corresponding thereto. Thus, for each pin bank 38 there is positioned, directly below the pins in the bank, a stop pad 48, a slot 49 to the right of the stop pad, and a surface area 50 to the left of the stop pad.

Assuming that a pin 38 is lowered and is positioned to the right of the corresponding stop pad 48, it passes through the slot 49 and contacts a rail 51 to close an electrical circuit, as described hereinafter, to drive shuttle 47 to the right until the respective stop pad 48 comes in contact with the actuated pin. If an actuated pin 38 instead comes down to the left of the stop pad 48, it contacts a shuttle surface area 50, completing a circuit through shuttle 47 to drive the shuttle to the left until the stop pad again contacts the actuated pin 38. There is a third possibility, namely that the actuated stop pin comes directly in contact with its respective stop pad 48. In this instance, the apparatus is already approximately positioned for correct operation and there is no necessity for moving reading shuttle 47. Therefore, an electrical circuit is completed through the stop pad to effect a character-reproduction operation as set forth hereinafter.

Figure 5, which shows the pin banks 38, the shuttle 47, and the rails 51 in operative relationship to each other, further shows shuttle 47 insulatingly mounted on plastic runners 52 which hold the shuttle for travel on rails 51.

As hereinbefore described, there is a constant or equivalent distance between adjacent pins 38. Thus, if the first pin in pin-bank 38A is actuated, it in turn, completes the necessary electrical circuitry to drive shuttle 47 in the correct direction until the respective stop pad 48A comes into contact with the pin. If the stop pads 48 were spaced apart a distance equal to the distance between like pins in the different pin-banks (i.e., the distance between pin number one in bank 38A and pin number one in bank 38B), the result would be that the first pin in the pin-bank 38A, the first pin in pin-bank 38B, the first pin in pin-bank 38C, and the first pin in pin-bank 38D, all would be in a position to contact their respective stop pad if any one of the first pins were actuated. Similarly, since all correspondingly positioned pins in the different pin-banks could contact their respective shuttle stops if any one of such pins were actuated, there thus would be only 11 stop positions for the shuttle 47. It is necessary, however, that the stop positions for the shuttle be equal in number to the keyboard character keys. This problem is overcome by maintaining a critical distance between adjacent stop pads 48, whereby shuttle 47 need only travel approximately 2 inches to achieve any one of 44 possible stop positions.

While the corresponding pins in adjacent pin banks are a distance D' apart, or are 2 1/16 inches apart (11 multiplied by 3/16 of an inch) in a standard typewriter the stop pads are spaced apart, in the direction of shuttle travel, by a distance D'' which enables corresponding stop pins in successive banks thereof to engage their respective stop pads 48 and stop shuttle 47 in successive positions. This distance D'' is computed by the formula $D''(s-1/n)$, where D is the center-to-center distance between stop pins 38, $s$ is the number of stop arm banks. In the drawings, therefore, the stop pads 48 are 2 1/64 inches apart. Thus, if the stop pad 48A is engaged by the first pin in the pin-bank 38A, stop pad 48B is 3/64 of an inch from the corresponding first pin in pin-bank 38B, stop pad 48C is 3/32 of an inch from the corresponding first pin in the pin-bank 38C, and stop pad 48B is 9/64 of an inch from the corresponding first pin in pin-bank 38D. It is therefore apparent that there are 44 positions, uniformly spaced from each other by a distance D' minus D'', or by 3/64 of an inch (2 1/16 inch less 2 1/64 of an inch), in which shuttle 47 may be stopped. The stop pins 38, together with their respective stop pads are thus adapted to position shuttle 47 in any one of 44 positions, and corresponding pins in different banks serve to position shuttle 47 in entirely different positions. With such an arrangement of pins and stop pads, the shuttle need only travel at the most 2 1/64 inches in order to achieve any one of 44 positions. This, in contrast to a single bank of pins and a single shuttle which would have to travel the full length of the keyboard, or approximately 8 inches, for different character selections, permits a much more rapid typing and photocomposing operation.

*Centering compensator*

It is possible that, without some form of centering device, the photocomposing exposure matrix controlled by the shuttle 47 can end up in two different positions for the same character to be reproduced, depending upon the direction from which a particular stop pad 48 approaches a lowered or actuated pin 38. This difference in character positions would be equal to the sum of the width of the stop pad 48 plus the width of the pin 38. To enable the character selected to be positioned at the same point regardless of the direction from which an actuated pin 38 is approached by a stop pad 48, a unique compensator, indicated generally at 53 in Fig. 1, is provided on one end of the reading shuttle 47.

Figure 6:
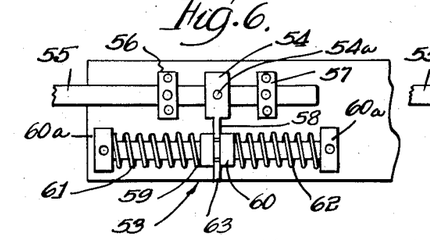
Figures 6–8 are views respectively showing the compensator apparatus at rest, with power on to move the reading shuttle to the left, and with power on to move the reading shuttle to the right.
Figure 7:
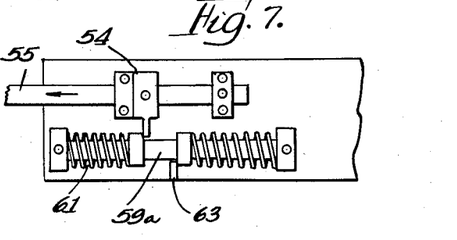
Figure 8:
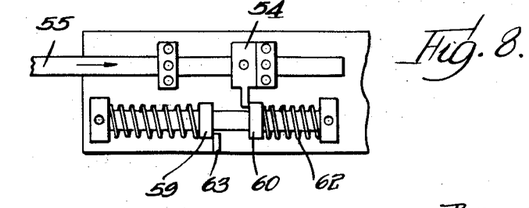

The compensator provides a means of linking the reading shuttle 47 with a rack mechanism or other device which positions an exposure shuttle in a photocomposing unit. Referring to Figs. 6 through 8, it is seen that a centering block 54 is fixed by means of a set screw 54a to a rod or shaft 55 which, as described hereinafter, drives the mechanism for positioning of the exposure shuttle in a photocomposing unit. Stop blocks 56 and 57, straddling the shaft 55, are rigidly fixed to the shuttle 47 by conventional means, such as bolts. An arm 58 extends from the centering block 54 and is engageable by a pair of members 59 and 60. Each member 59 and 60 is slidably mounted on a rod 59a held between two supports 60a—60a which are fixed to shuttle 47. The members 59 and 60 are biased, by springs 61 and 62 respectively, in opposed directions and toward each other. A stop pin 63 mounted on shuttle 47 is placed in such relationship with members 59 and 60 as to prevent them from contacting each other.

By reference to Figure 7, it is seen that when the shaft or rod 55 is moved to the left, the centering block 54 moves a relatively short distance until it contacts the stop 56 thereafter, continued movement of the rod 55 to the left causes a corresponding movement of the shuttle 47. Of course, the movement of centering block 54 from its initial position (Figure 6) to the position shown in Figure 7 compresses spring 51. Consequently, when movement of the rod 55 is interrupted, spring 61 expands and returns centering block 54 to its initial position, thereby restoring the centering block 54, the rod 55, and the shuttle 47 to their original relationship.

Likewise, and as illustrated in Figure 8, power applied to shaft 55 to move the shaft to the right compresses spring 62 until centering block 54 contacts stop 57. When the rod 55 is subsequently released, spring 62 expands and again restores centering block 54, shaft 55, and shuttle 47 to the initial position of Figure 6.

In either case, whether shaft 55 is utilized to drive shuttle 47 to the right or to the left, when the drive connection to the shaft is subsequently released, as described hereinafter, centering block 54 is always returned to the position, relative to shuttle 47, shown in Figure 6. In order to be sure that the spring-controlled compensating motion between shaft 55 and shuttle 47 is effective to compensate for the thickness of stops 48 and pins 38, the distance separating stop 56 and centering block 54, when power is off, should be made equal to one-half the combined width of a stop pad 48 and stop pin 38. Of course, the device should be constructed to afford a similar spacing between centering block 54 and stop 57.

The compensator apparatus illustrated in Figures 6–8 makes it possible to align a photocomposing matrix in a given selected position, regardless of whether an actuated stop pin 38 is approached from the right or from the left by its associated stop pad 48.

Matrix locking

Figure 9:
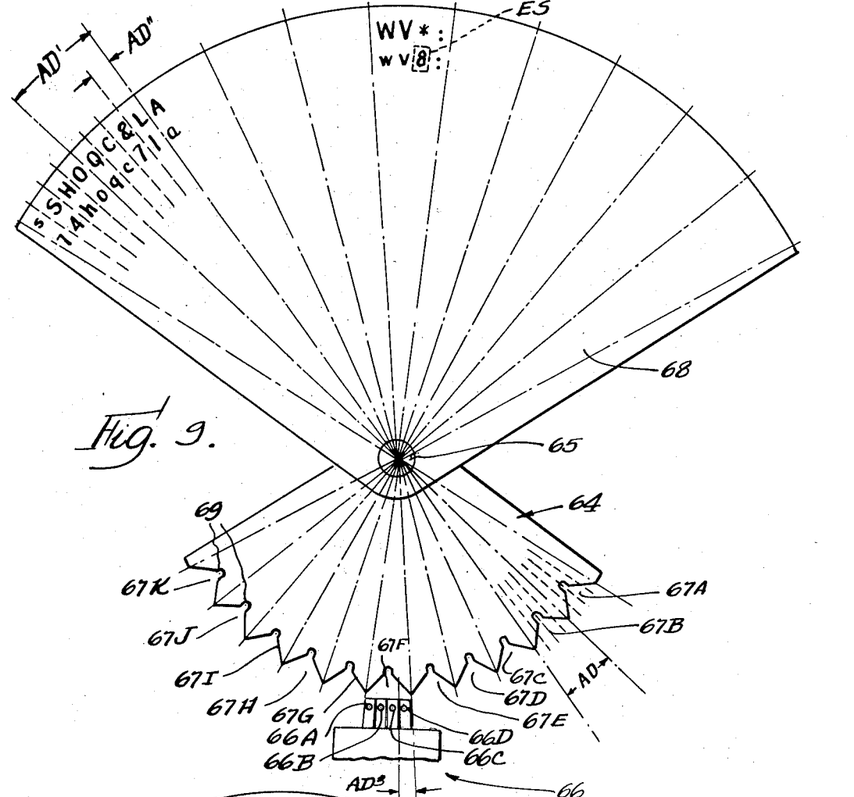
Figure 9 is a schematic plan view of the character matrix and of the locking mechanism therefor.

The exposure matrix of the photocomposing unit must be stopped in the same number of positions as there are character keys on the typewriter keyboard. Theoretically this is accomplished by the keyboard reading mechanism hereinbefore described and the forty-four different positions in which the shuttle 47 is stopped, since the shuttle is connected to the exposure segment. In practice, however, it has been found that any cumulative error, such as may be introduced by normal manufacturing tolerances, results in imperfect positioning of the character selected for photographing, with the ultimate text material so composed having incorrect character spacing which is noticeable to the eye. In order to overcome this difficulty, a locking disc segment 64 is provided. As shown in Fig. 9, this disc segment or plate 64 is nonrotatably mounted on a shaft 65 and maintained in fixed relationship to the character exposure matrix 68 and its mechanical positioning train, which is hereinafter described.

Two different arrangements of locking slots on locking disc segment 64 are possible. If the same number of slots are provided on the plate 64 as there are exposure characters and character keys, and if the cumulative error in positioning shuttle 47 is more than one-half the center-to-center distance between the slots on member 64, then the locking mechanism may select the wrong slot and cause the wrong character to be positioned for photographing. However, by reducing the number of slots to eleven, by increasing the size of the slots, and by providing four locking probes, the cumulative error which might possibly result during the positioning of shuttle 47 may be plus or minus two full characters, and still the correct character is positioned for exposure.

The desired accurate positioning is achieved by the following arrangement. Eleven locking slots 67 are provided in locking disc 64, the slots being dividually designated 67A, 67B, 67C . . . 67K, as shown in Fig. 9. The four locking probes 66, which are individually labeled 66A, 66B, 66C and 66D respectively, are operatively positioned so that a slot 67 positioned in front of the probes may be locked in any one of four positions, depending upon which probe 66 is actuated and projected radially forward toward the plate 64. Thus, there being eleven slots 67, each of which is capable of being locked in any one of four positions, it is possible to lock shaft 65, and the character exposure matrix 68 rotated thereby, in any one of forty-four possible positions.

Figure 10:
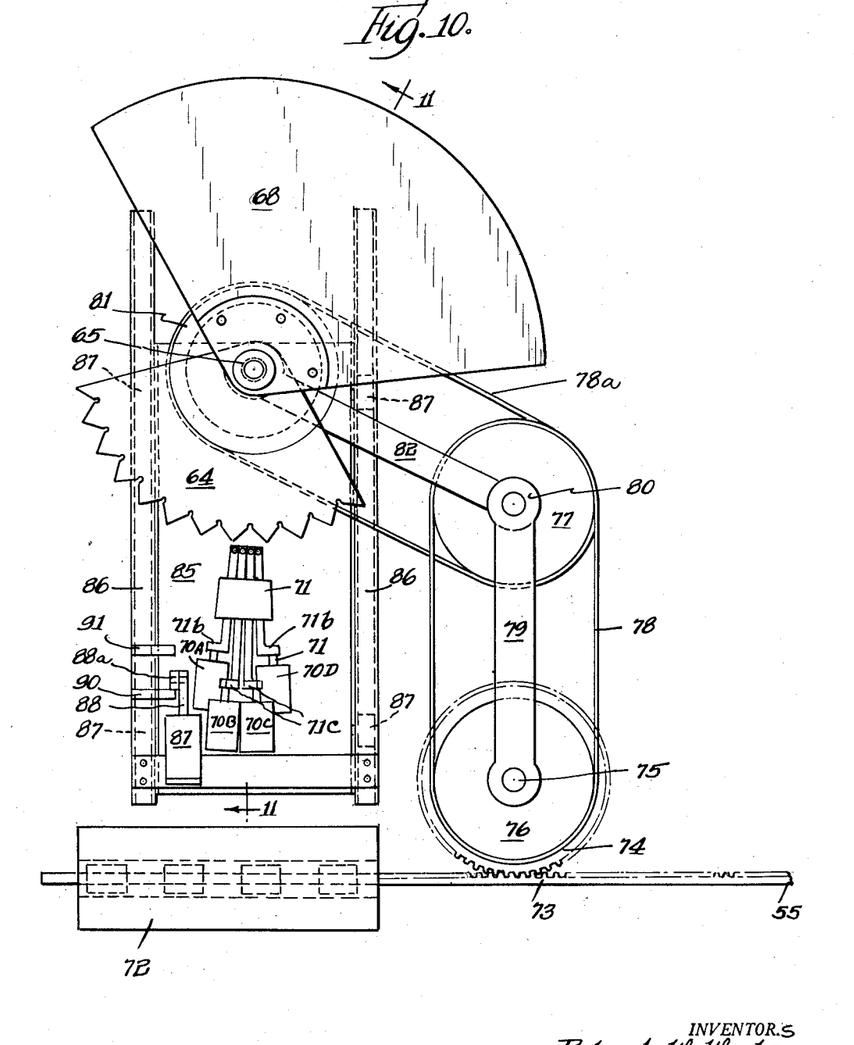
Figure 10 is a plan view of the character matrix drive train and the solenoid actuated locking arms used to lock the font accurately in position.
Figure 11:
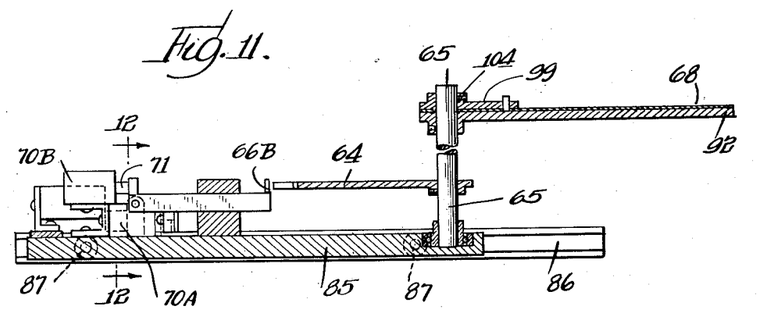
Figure 11 is a cross-sectional elevation view, taken approximately on lines 11—11 in Figure 10.
Figure 12:
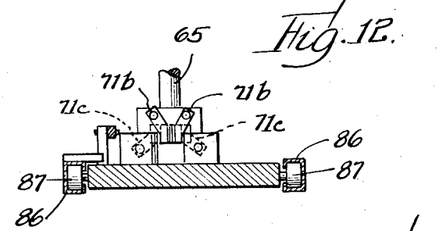
Figure 12 is a cross-sectional view looking in the direction of the arrows 12—12 in Figure 11.

At the inner end of each slot is a radial passage into which the locking probes 66 are adapted to fit. Each probe 66 is actuated by an individual solenoid 70, correspondingly designated 70A, 70B, 70C and 70D. As seen in Figs. 10–12, the solenoids 70 are staggered for compactness, with solenoids 70A and 70D located below solenoids 70B and 70C. Four arms 71A, 71B, 71C and 71D are mounted in a guide 71a for movement therethrough, with a respective probe 66 mounted on each arm for movement therewith. Two ear portions 71b are adapted to mount arms 71A and 71D to their respective solenoid plungers for movement therewith, while two ear portions 71c mount arms 71B and 71C to the plungers of their respective solenoids for movement therewith. In turn, probes 66 extend upwardly from their respective arms 71 to an equal height sufficient to to enable each probe to enter slots 67 and their terminal portions, the radial passages 69.

All slots 67 are equidistant from shaft 65, as are the inner ends of each radial passage 69. Further, the slots 67 are uniformly angularly spaced so that each slot controls the positioning of four characters on exposure matrix 68. Thus, the angular distance AD between locking slots 67 is equal to the angular distance AD' spanning four exposure characters, as seen in Fig. 9. The exposure characters, in turn, are uniformly located, being equally spaced from the right sides of respective adjacent imaginary lines or bases (shown as dotted lines for explanation purposes) which are themselves equally angularly spaced from each other by an angle AD'' equal to one quarter of the angular distances AD or AD'. In this manner, the equidistant spacing of all exposure characters from uniformly spaced imaginary lines enables the character exposure matrix to be correctly positioned at the exposure area for all characters, since each imaginary base line shown in Fig. 9 is locked in the same position with regard to the exposure area or station ES when the respective adjacent character is selected for photographing.

In order to achieve uniform angular advancement of locking plate 64 when a locking slot 67 is positioned before locking probes 66, the probes are likewise angularly spaced by an angular distance $AD^3$ which is equal to the angular distance AD'' between adjacent imaginary base lines. In Fig. 9 it seen that locking slot 67F and its radial passage 69 are positioned before probe 66B. As the probe solenoid 70B is energized the probe 66B travels forward, thereby engaging the sides of the slot 67F if the radial passage 69 thereof is not directly in the line of probe travel. This, in turn, causes locking disc 64 to rotate slightly until the probe 66B enters the radial passage 68, after which probe travel ceases as it strikes the closed end of the passage. This action accurately positions the exposure disc so that the third character represented by slot 67F, namely the numeral "8" (assuming lower case characters are being reproduced), is positioned for photographing.

Assuming, instead, that the letter $v$ is to be positioned, then solenoid 70C is energized to project probe 66C into slot 67F. This causes shaft 55 and character exposure matrix 68 to be rotated an angular distance equivalent to the angular displacement AD" between the imaginary base lines. Since there is equal angular displacement between all imaginary base lines, it is obvious that probes 66 and locking slots 67 are capable of accurately positioning the exposure segment in any one of forty-four uniformly spaced positions.

Each solenoid 70 is electrically connected with one of the stop pads 48 on shuttle 47. Thus, if a pin 38 in pin-bank 38A is lowered, contact by the lowered pin with the corresponding stop pad 48A completes a circuit to energize the related solenoid 70A, and causes locking probe 67A to enter the locking slot positioned before it. Movement of probe 67A into the radial passage 69 associated with the slot accurately positions locking disc segment 64, and hence character matrix 68, is accurately aligned for photographing the character associated with the lowered pin. The other solenoids 70 are similarly operatively associated with corresponding ones of the stop pads 48.

*Index drive*

Referring to Fig. 10, it is seen that the shaft 55 which drives shuttle 47 extends through a reversible linear motor 72. In the area of the linear motor 72, shaft 55 serves to carry an armature for the motor. Between the linear motor and the compensating mechanism 53 (Figs. 6–8), shaft 55 is formed in the shape of a rack 73 with which a pinion 74, rotatable about a fixed shaft 75, is engageable. Nonrotatably fixed on shaft 75 is a wheel 76, which is affixed to pinion 74 and effectively linked to another wheel 77 by means of a steel band 78 which frictionally drives wheel 77. A spacer bar 79 maintains a fixed distance between wheels 76 and 77 with the pivot shaft 80 of wheel 77 being free floating.

Wheel 77 frictionally drives another wheel 81, nonrotatably mounted on shaft 65, through a second steel band 78a. A second rigid spacer bar 82 maintains a fixed distance between friction wheels 77 and 81. As pinion 74 is turned by rack 73, it in turn drives wheels 76, 77 and 81 to rotate shaft 65 and position the proper locking V-slot 67 before locking probes 66, as well as approximately positioning the desired exposure character on exposure matrix 68.

*Shift mechanism*

Since both upper and lower case characters must be available for printing, two concentric bands of characters 83 and 84 are provided on the exposure shuttle or matrix 68 for each type size and style which is to be used, with each band bearing exposure characters equivalent to the characters selectable on the character keys 31. To position either the upper or lower case characters, shaft 65 is mounted on a carriage 85, held between two rails 86—86 (Fig. 10). Wheels 87 mounted on each side of carriage 85 permit the carriage to slide along the rails. To maintain a constant relationship between shaft 65 and locking probes 66, solenoids 70 and the mechanism connected thereto are mounted on carriage 85 to move therewith.

As shown in Fig. 10, carriage 85 is tied to the plunger 88 of a shift solenoid 87. Each time the shift key 31a on the typewriter is depressed, it closes an electrical contact 139 (Fig. 23) to energize solenoid 89 and moves carriage 85 downwardly (as viewed in Fig. 10) until a portion 88a on the plunger engages a stationary stop 90. This positions the upper case character ring or band 83 for photographing the characters thereon. Release of the shift key in turn deenergizes solenoid 89 and permits plunger 88 to be spring returned and thus carry carriage 85 back to its original position abutting a second stationary stop 91. In this position, exposure font 68 is positioned for the reproduction of lower case characters on band 84.

Since pivot 80 is free floating, shifting of the shaft 65 in no way affects the relationship between the drive mechanism and shaft 65. Rigid spacer bars 79 and 82 maintain the same fixed spacing between the wheels 76, 77 and 81 so that shifting of the carriage 85 in no way affects the drive train.

*Arrangement of exposure characters on matrix 68*

Figure 13:
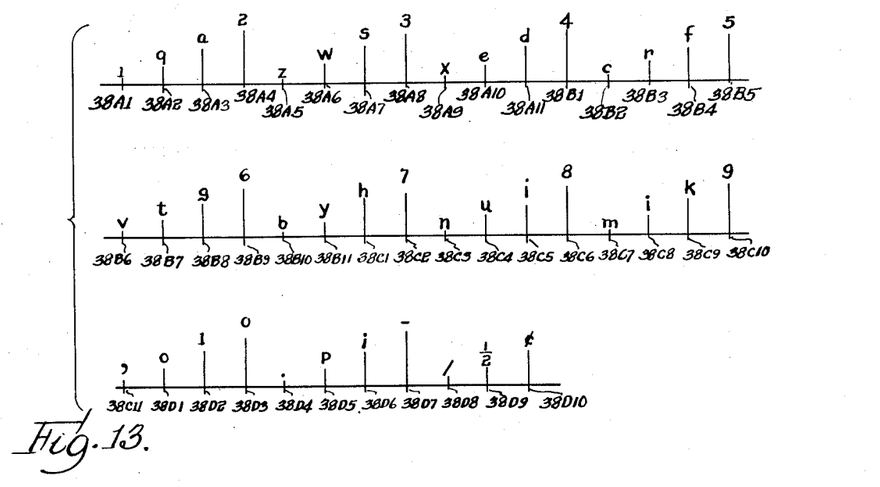
Figure 13 graphically discloses the relationship between the stop arms and the characters related thereto.

The order of characters on the exposure shuttle 68 is determined by the order on the keyboard of the pilot typewriter. Fig. 13 shows the conventional order of the lower-case characters as read from left to right on the keys of a standard typewriter manufactured by the International Business Machines Corporation. Below each keyboard character, as indicated in Fig. 13, the pin-bank the character falls into and the position of the character is represented by a pin 38 in that bank, reading from left to right. Thus, it can be seen that the letter $z$ falls into pin-bank 38A and is represented by the fifth pin in that bank. Likewise, the letter $h$ falls in pin-bank 38C and is represented by the first pin in that bank. The remainder of the characters are similarly designated. It is pointed out that while forty-four keys are shown in Fig. 1, the character reproducible by the extreme right-hand character key is left undesignated so that any special characters required may be selected by operation of that key.

Figure 14:
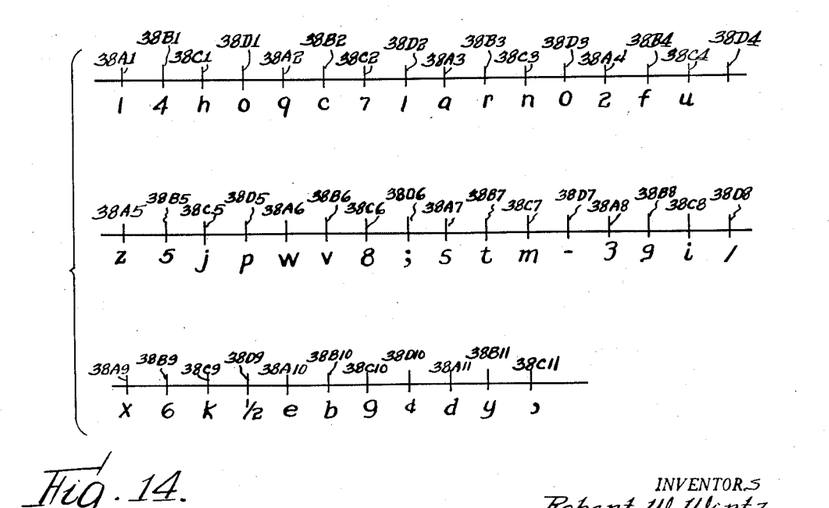
Figure 14 graphically shows the order of the characters on the character matrix, and of the stop pins related thereto.

As hereinbefore disclosed, because of the design of the keyboard reading mechanism, the distance shuttle 47 must travel for positioning characters represented by like pins in the adjacent banks, i.e., between pin 38A1 and pin 38B1, is $3/64$ inch. Thus, the 38A1 and the 38B1 characters are $3/64$ inch apart, the 38A1 and the 38C1 characters are $3/32$ inch apart, while the 38A1 and the 38D1 characters are $9/64$ inch apart; the shuttle travel between the 38A1 and the 38A2 characters is $3/16$ inch, or the center-to-center distance between successive keyboard keys and their respective pins. The order for the characters on exposure matrix 68 therefore is represented by the pins in the following order: 38A1, 38B1, 38C1, 38D1, 38A2, 38B2, 38C2, 38D2, 38A3, etc. This is clearly shown in Fig. 14 which graphically depicts the order of the exposure characters on exposure font 68, reading from left to right, and corresponds to the successive order in which shuttle 47 is stoppable by the pins 38.

Figure 15:
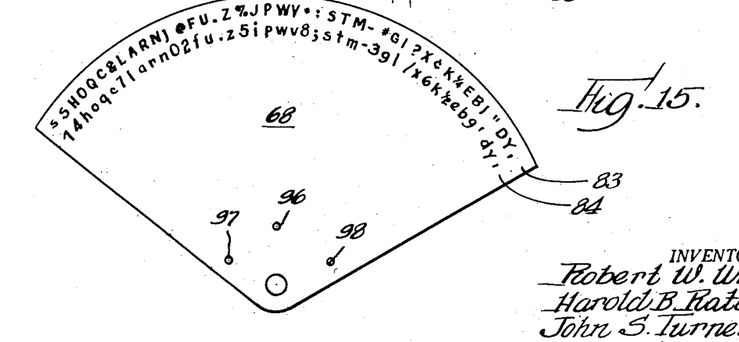
Figure 15 is a plan view of a photographic character matrix and the characters thereon.
Figure 16:
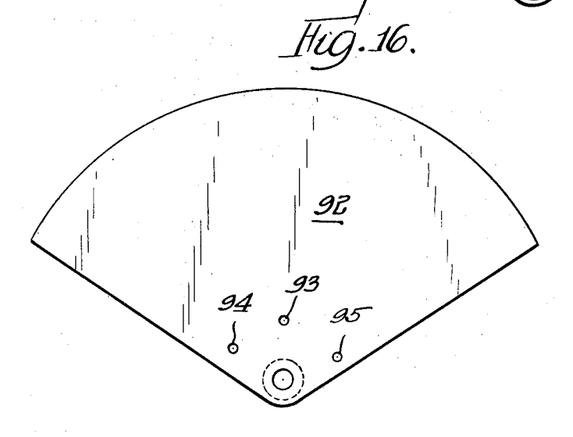
Figure 16 is a plan view of the carrier plate for the photographic character matrix.
Figure 17:
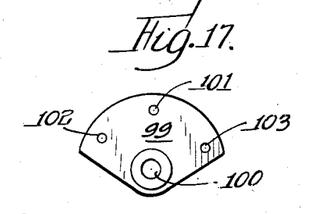
Figure 17 is a plan view of the cooperating locking plate.
Figure 18:
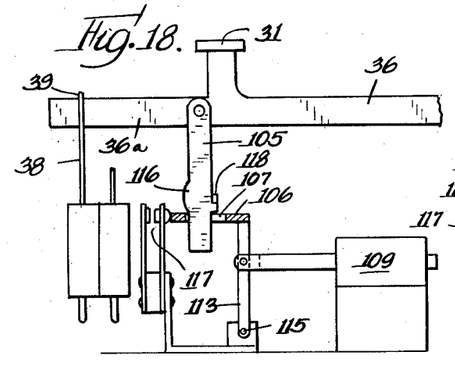
Figures 18, 19 and 20 are side views of the synchronizing mechanism respectively at rest, with a key down but before actuation, and with a key in operative position.

Fig. 15 shows the complete exposure matrix 68 with the upper-case characters formed into the annular band 83 concentric with shaft 65, and the lower-case characters formed into a second concentric annular band 84. The exposure matrix 68 may, for example, be formed as a photographic negative image on dimensionally stable vinyl plactic approximately .060 inch thick. In making the matrix, the vinyl is coated with a light-sensitive emulsion and then exposed and processed. Once the master art work is prepared, contact prints can be made very inexpensively. It is evident, of course, that it makes little difference whether the characters are clear and their background is opaque, or vice versa. After processing, a coating of vinyl lacquer is applied over the image in order to protect it against normal abrasive wear.

*Exposure segment carrier*

As shown in Figs. 11, 15, 16 and 17, a light transmissive carrier plate 92, mounted for rotation with shaft 65, is provided to hold the character exposure matrix 68. Three dowel pins, 93, 94, 95, are provided on plate 92 for mounting the exposure segment thereon by means of correlated mounting holes 96, 97, 98, provided in exposure matrix 68. A locking plate 99, having a center hole 100 for mounting on shaft 65, and holes 101, 102, 103 for mounting over the dowel pins, is provided for holding the exposure matrix properly in place. A locking screw 104 holds all parts together, while enabling rapid interchange of exposure matrixes for different size and styles of characters.

*Synchronizing mechanism*

In order to retain any stop pin 38 in a lowered position, once its respective key 31 is depressed, so that it is in position to stop movement of shuttle 47, the synchronizing mechanism shown in Figs. 18 to 22 is provided. The mechanism is operatively connected with each lever extension 36a at a point adjacent to the pin 38 carried thereby. The synchronizing mechanism not only acts to retain any actuated pin 38 in a lowered position, but also prevents actuation of any other key 31 until the previous initiated printing cycle is completed.

Each lever extension 36a has fixed thereto a downwardly depending arm 105, which, as its respective key 31 is depressed, is lowered to actuate the synchronizing mechanism. A movable locking plate 106, having an aperture 107 therein for each arm 105, is provided below the lever extensions 36a. Movement of plate 106 to locking position is achieved through energization of a pair of solenoids 108, 109. The solenoid plungers 110, 111 of solenoids 108 and 109 respectively are attached to legs 112, 113 which at their lower ends are respectively mounted for rotation at pivots 114, 115. At their upper ends, the legs carry locking plate 106.

Figure 19:
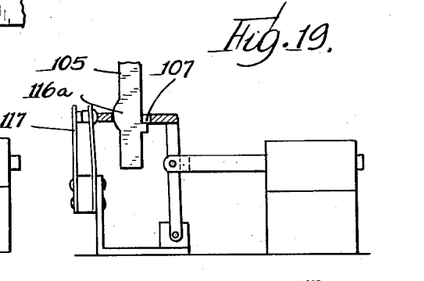
Figure 20:
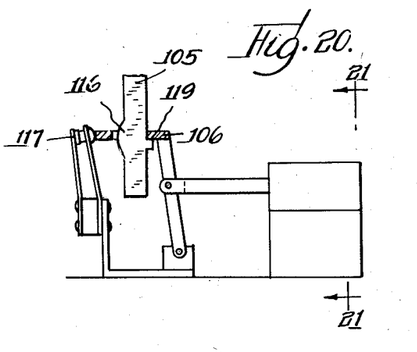

Energization of solenoids 108, 109 is achieved in the following manner. Each arm 105 has a cam surface 116 which, as the arm is lowered, engages an end wall 116a of the respective aperture 107 through which the arm passes, causing plate 106 to move slightly, thereby closing the contacts of an anti-recycle switch 117 and completing the necessary circuit to energize solenoids 108 and 109, as seen in Figure 19. Energization of the solenoids projects the locking plate forwardly, as seen in Fig. 20.

Figure 21:
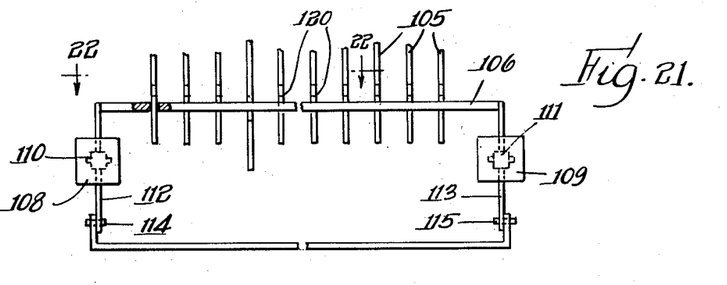
Figure 21 is a sectional view taken approximately on lines 21—21 in Figure 20.
Figure 22:
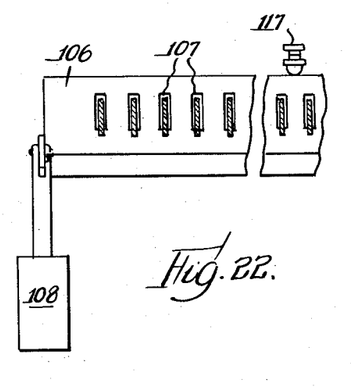
Figure 22 is a plan view taken approximately along lines 22—22 in Figure 21.

Each arm 105 also carries a protrusion 118, the upper end 119 of which is adapted to abut plate 106 when the arm is lowered and after solenoids 108 and 109 are energized. The lowered arm thereby is prevented from moving upwardly, even if its key 31 is released. Forward movement of locking plate 106 not only serves to retain an actuated key in depressed position, but further prevents actuation of any other character key, since the lower ends 120 on the protrusions 118 of the remaining arms 105 abut locking plate 106, thereby preventing operation of the remaining keys 31, as best seen in Fig. 21. Only after the print cycle is completed for the character corresponding to an actuated key is it possible to select the next character for printing. Moreover, if a key 31 is held down after completion of the print cycle, switch 117 is maintained closed by cam 116 on the lowered arm 105 so that repeat printing is prevented.

*Operation and circuit diagram*

Figure 23:
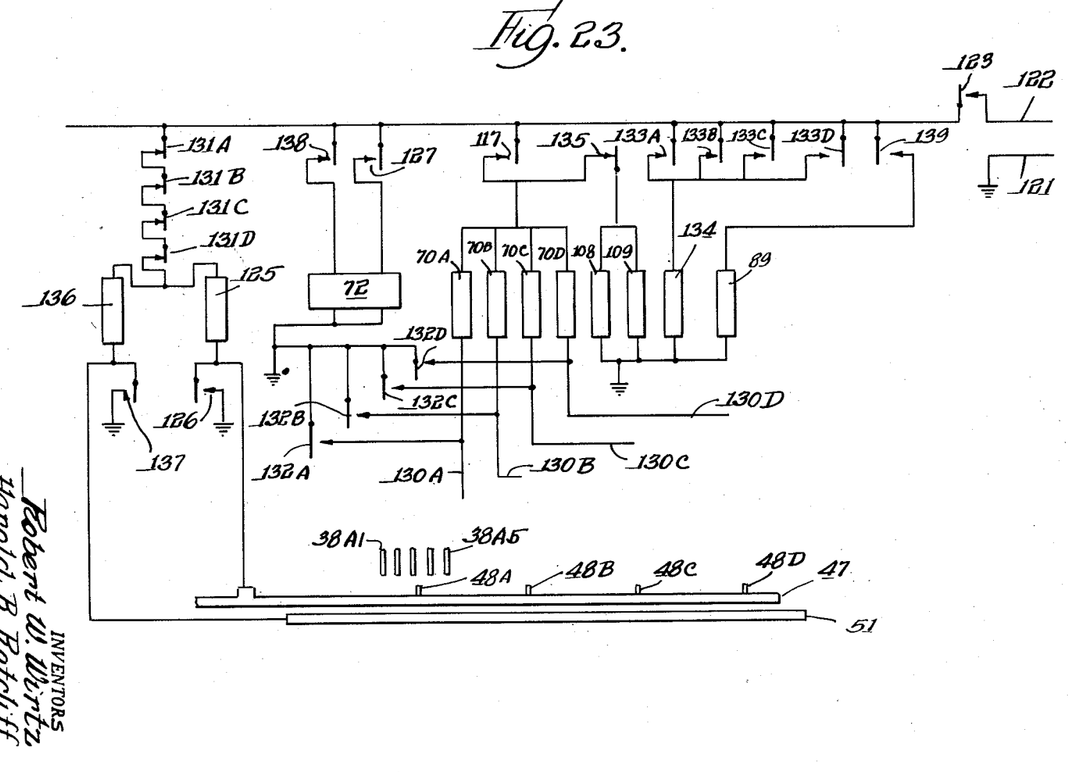
Figure 23 is a circuit diagram showing in a schematic way a preferred form of control circuit with certain mechanism constructed and arranged in accordance with the invention.

Referring now to Fig. 23, the apparatus is supplied with electrical power, preferably at 24 volts D.C., through two lines 121, 122 and a switch 123. The operation of any character key 31 energizes motor 72 which drives the reading shuttle 47, and hence the exposure matrix 68, until a given lowered pin 38 is engaged by its respective stop pad 48. Engagement of the pin with the stop pad establishes the control circuits needed to complete a character-reproducing cycle. Assuming that a character key 31 having a pin 38 in pin-bank 38A is depressed, and assuming that the pin is initially positioned to the left of its respective stop pad, as is the pin 38A1 shown in Fig. 23, the complete cycle of operation for the apparatus is as follows:

Depression of the pin 38A1 causes it to strike contact area 50A on shuttle 47, completing an electrical circuit through the shuttle and the brush 124 to energize a motor control left-drive relay 125 which is electrically locked in through a pair of contacts 126. Energization of relay 125 further closes a pair of contacts 127 to energize the field windings of reversible linear motor 72, driving the armature of the motor to the left (see Fig. 10). Shuttle 47 and exposure matrix 68 are correspondingly moved, through shaft 55, until stop pad 48A strikes the lowered pin 38A1.

As shuttle 47 is pulled to the left, centering block 54 is pulled against stop block 56, compressing spring 61 (see Fig. 6). This completes the approximate positioning at the exposure area ES, of the character on matrix 68 corresponding to the lowered pin 38A1.

While pin 38A1 causes the initial positioning of its corresponding exposure character, arm 105 (Figs. 18 to 21), depending from the same extension 36a as does pin 38A1, closes anti-recycle switch 117, completing an electrical circuit to energize synchronizing solenoids 108, 109. This action locks the actuated arm 105 in its lowered position, preventing the key associated with pin 38A1 from rising, as hereinbefore explained.

As best seen in Fig. 4, shuttle 47 is provided with four contact strips 128A, 128B, 128C and 128D which are respectively connected to stop pads 48A, 48B, 48C and 48D, each shuttle stop 48 being insulated from the shuttle and from the other stops. A cooperating brush contact 129A, 129B, 129C and 129D is correspondingly provided for each contact strip. Thus, as contact is made between pin 38A1 and stop 48A, an electrical circuit is completed from ground, through pin 38A1, stop 48A, strip 128A, brush 129A, and a line 130A to latching solenoid 70A. Anti-recycle switch 117 already is closed by initial depression of the key corresponding to pin 38A1.

Solenoid 70A controls three sets of contacts. Normally closed contact pair 131A opens as the solenoid is energized, thereby breaking the electrical circuit to relay 125. Relay 125, when de-energized, allows contacts 127 to return to their normally open position, thereby de-energizing reversible motor 72. The second contact pair, normally open contacts 132A, electrically locks in solenoid 70A, assuring continuation of the print cycle even though the physical contact between pin 38A1 and stop 48A is broken.

As the plunger 71 of solenoid 70A is projected forward, it causes probe 66A to enter a slot 67 in locking disc segment 64, which in this example is slot 67A, to accurately position the matrix 68 for the subsequent photographing of the exposure character corresponding to pin 38A1. As probe 66A reaches the end of its travel in radial passage 69, plunger 71A closes the third set of contacts 133A controlled by solenoid 70A, thereby completing the necessary electrical circuit to energize a shutter solenoid or other device 134 which trips the photocomposer shutter.

It is pointed out that each of the other latching solenoids 70 controls similar contacts. That is, the opening of any one of the normally closed sets of contacts 131B, 131C or 131D, by energizing the respective latching solenoid, in turn de-energizes motor 72; the closing of normally open contacts 132B, 132C or 132D establishes holding circuits for their respective solenoids; and, the closing of any one of the normally open sets of contacts 133B, 133C, or 133D, by energizing the corresponding latching solenoid, energizes shutter solenoid 134.

Near the end of the travel of the plunger in shutter solenoid 134, and after the shutter is tripped, the shutter solenoid plunger opens a pair of normally closed contacts 135, breaking the electrical circuit to synchronizing solenoids 108 and 109. De-energization of these solenoids moves locking plate 106 from engagement with the actuated arm 105, permitting the corresponding key to return to its normal position. At the same time, anti-recycle switch 117 is permitted to open, de-energizing latching solenoid 70A and resetting the entire apparatus in preparation for the next character selection.

Similarly, assuming that a character key having a pin 38 in pin-bank 38A is depressed, and further assuming that the pin is initially located to the right of its respective stop pad 48A, as is the pin 38A5 in Fig. 23, lowering of pin 38A5 allows it to pass through the slot 49A until it strikes rail 51. Thereupon, a motor control right-drive relay 136 is energized and is electrically locked in through a pair of contacts 137. Simultaneously, a second pair of contacts 138, also controlled by relay 136, is closed to energize the field windings of reversible motor 72, driving the motor armature and the shaft 55 to the right until stop 48A strikes actuated stop pin 38A5. Thereafter, the sequence of operation is the same as previously described.

Repeat printing, which normally tends to occur when an actuated key is held in depressed position over an extended period of time, is prevented by the herein-described apparatus. As long as any character key 31 is held in depressed position, anti-recycle switch 117 remains closed, maintaining the related solenoid 70 energized. Therefore, while the plunger of shutter solenoid may have finished its power stroke, the energized solenoid 70 maintains its corresponding contacts leading thereto closed, thereby preventing reset of shutter solenoid 134, and hence of the shutter.

Moreover, while a first key is retained in depressed position after completion of the photographing operation, depression of a second character key (permitted since solenoids 108 and 109 are de-energized after contacts 135 are opened) has no effect upon the apparatus. As long as the first key remains depressed and the solenoid 70 operated energized, one of the sets of solenoid actuated contacts leading to the motor control relays 125 and 136 remains open. Under such a condition, energization of motor 72 is impossible, and further indexing of matrix 68 is prevented until the first key is released.

Also, as previously described, there can be no selection of a second character for indexing and photographing until the cycle of operation for the previously selected character is completed. Until shutter solenoid 134 finishes its operation and opens contact 135, the synchronizing apparatus prevents depression of the other character keys.

It is to be understood that the invention is not restricted to the illustrated and described embodiment, and that various changes may be made without departing from the spirit of the invention as set forth in the following claims.

We claim:

1. Automatic indexing apparatus for selectively positioning a matrix bearing an assortment of exposure characters thereon corresponding to the characters selectable by operation of the character keys on a typewriter, comprising a rotatable shaft, means to mount said matrix for rotation with said shaft, a set of stop pins, one extending from each typewriter character key and actuatable thereby, a reading shuttle disposed for linear movement below said stop pins, reversible drive means connected with said shuttle, a motion translating train connecting said shuttle and said shaft to convert linear shuttle movement into rotary shaft movement, means operatively connected with said drive means to determine the direction of shuttle movement and to actuate said drive means, upon operation of a character key, to move the shuttle in a direction toward the stop pin depending from said character key, means on said shuttle to engage said stop pin and arrest shuttle movement, a locking disc segment carried by said shaft for rotation therewith, said disc segment having a set of radial locking passages arranged about its peripheral edge, movable locking means engageable in any one of said passages to accurately position and lock said shaft and said matrix for photographing the character corresponding to said key, motor means to move said locking means, and means operatively connecting the motor means to the means on said shuttle, whereby said motor means is actuated as the means on said shuttle engages said stop pin.

2. Automatic indexing apparatus as described in claim 1, characterized by the fact that positioning of an exposure character for photographing is independent of the direction from which said shuttle approaches an actuated stop pin, said apparatus additionally including a bar effectively connected with said shaft and mounted on said shuttle for movement relative thereto, an arm carried by said bar, stops engageable with said arm to limit the relative movement of said bar with respect to said shuttle, opposed springs acting on said arm to center it between said stops, and a centering stop to limit the effectiveness of said springs, whereby as said shuttle is moved by said drive means, said arm is drawn against one of said stops to stress one of said springs, and after the means on said shuttle strikes said lowered stop pin, the stressed spring imparts differential movement to said bar independent of said shuttle to rotate said shaft and accurately align said matrix for photographing that character corresponding to said operated key.

3. The apparatus of claim 2 wherein the distance between the arm when centered and either stop engageable thereby is equal to one-half the combined width of the means on said shuttle and the stop pin engaged thereby.

4. Automatic indexing apparatus controlled by a typewriter having a set of character key levers, said apparatus being adapted to position a font having exposure characters thereon, each of said exposure characters corresponding to a related one of said key levers, whereby an exposure character on the font is positioned for photographing each time a corresponding character key lever is operated, comprising: a shuttle disposed adjacent said key levers, stop means controlled by said key levers to arrest shuttle travel at any one of a plurality of predetermined locations, each one of said locations representing a corresponding one of said character key levers, drive means connected with said shuttle, means connected with said drive means to determine the direction of shuttle travel and to actuate said drive means upon operation of a character key lever, means to carry the font, a motion transmission train connecting said latter means with said shuttle, said train including yieldable means having no effect to move said font until stressed and until travel of said shuttle is arrested, said yieldable means subsequently being operative to impart differential movement to said font independent of said shuttle to effect accurate alignment at a photographic area of the exposure character corresponding to said operated character key lever, wherein said yieldable means includes a bar effectively connected with the means to carry the font and mounted to said shuttle for movement relative thereto, a body fixed to said bar, a pair of opposed springs acting on said body to center it between two limits, and a centering stop to limit effectiveness of said springs so that said body is normally releasably positioned equidistant between the limits, whereby actuation of said drive means to move said shuttle causes said body to travel to one of said limits and stress one of said springs, and arrest of said shuttle travel allows the stressed spring to act on said body and move said bar and said font independently of said shuttle to accurately position an exposure character for photographing.

5. Automatic indexing apparatus controlled by a typewriter having a set of character key levers, said apparatus being adapted to position a font having exposure characters thereon, each of said exposure characters corresponding to a related one of said key levers, whereby an exposure character on the font is positioned for photographing each time a corresponding character key lever is operated, comprising: a shuttle disposed adjacent said key levers, stop means controlled by said key levers to arrest shuttle travel at any one of a plurality of predetermined locations, each one of said locations representing a corresponding one of said character key levers, drive means connected with said shuttle, means connected with said drive means to determine the direction of shuttle travel and to actuate said drive means upon operation of a character key lever; means to carry the font, a motion transmission train connecting said latter means with said shuttle, said train including yieldable means having no effect to move said font until stressed and until travel of said shuttle is arrested, said yieldable means subsequently being operative to impart differential movement to said font independent of said shuttle to effect accurate alignment at a photographic area of the exposure character corresponding to said operated character key lever, wherein the stop means controlled by said key levers includes a plurality of stop arms, each of said stop arms depending from a corresponding character key lever and is actuatable thereby, said stop arms being arranged to form $n$ banks generally comprising $s$ stop arms, said banks being arranged in staggered order; and further comprising $n$ abutments on said shuttle, one for each stop arm bank and so arranged on said shuttle as to strike only the stop arms in the related stop arm bank, said apparatus further being characterized by the fact that: (1) the stop arms are uniformly spaced in the direction of shuttle travel from adjacent stop arms by a center to center distance of D units, (2) the abutments are uniformly spaced in the direction of shuttle travel from adjacent abutments by a distance $D(s-1/n)$ units.

6. The apparatus of claim 5 wherein the means to determine the direction of shuttle travel and to actuate the drive means causes the shuttle always to be driven in that direction which enables an actuated stop arm to engage the shuttle abutment corresponding to the stop arm bank wherein the actuated stop arm is located, and includes an electrical contact area on said shuttle to one side of each abutment and a passage through said shuttle at the opposed side of each abutment, and additionally including a guideway for said shuttle, whereby contact by an actuated stop arm with any contact area energizes said drive means to drive the shuttle in a first direction while contact by any actuated stop arm with said guideway energizes said drive means to drive the shuttle in a direction opposite to said first direction.

7. The apparatus of claim 5 and additionally including means to maintain any actuated stop arm in operative position, comprising a portion extending from each key lever, means adapted to abut that portion extending from any actuated key lever, motor means to move the latter means, and means to actuate said motor means as a key lever is actuated, whereby said latter means is projected by said motor means to a position where it abuts the portion extending from said actuated key lever to maintain the stop arm depending therefrom in operative position, while abutting the portions extending from the other key levers to prevent the actuation thereof.

8. Automatic indexing apparatus controlled by a typewriter having a set of character key levers, said apparatus being adapted to position a font having exposure characters thereon, each of said exposure characters corresponding to a related one of said key levers, whereby an exposure character on the font is positioned for photographing each time a corresponding character key lever is operated, comprising: a shuttle disposed adjacent said key levers, stop means controlled by said key levers to arrest shuttle travel at any one of a plurality of predetermined locations, each one of said locations representing a corresponding one of said character key levers, drive means connected with said shuttle, means connected with said drive means to determine the direction of shuttle travel and to actuate said drive means upon operation of a character key lever, means to carry the font, a motion transmission train connecting said latter means with said shuttle, said train including yieldable means having no effect to move said font until stressed and until travel of said shuttle is arrested, said yieldable means subsequently being operative to impart differential movement to said font independent of said shuttle to effect accurate alignment at a photographic area of the exposure character corresponding to said operated character key lever, wherein the means to carry the font includes a first rotatable shaft about which the font exposure characters are arranged in a first arcuate band of lower case characters and in a second concentric band of upper case characters, means for bodily shifting said first shaft to position either one of said concentric bands for photographing the characters thereon; and further wherein the motion transmission train includes a rack connected with said shuttle, a pinion engaging said rack, a rotatable fixed-position shaft carrying said pinion, a free floating rotatable shaft, a spacer to maintain a set distance betwen the fixed-position shaft and the free floating shaft, a second spacer to maintain a set distance between the latter shaft and the first shaft, means drivably connecting the fixed position shaft to said free floating shaft, and means drivably connecting the latter shaft with said first shaft, whereby said motion transmission train connecting said shuttle to said first shaft remains effective regardless of the position of said first shaft.

9. Automatic indexing apparatus controlled by a typewriter having a set of independently operable character keys for selecting characters to be reproduced, and a set of key levers, each actuatable by one of said character keys, said apparatus being adapted to position a photographic matrix having an exposure character thereon for each character selectable by operation of said character keys, whereby a corresponding exposure character is positioned for photographing each time a related character key is operated, comprising a plurality of banks of stop arms, each of said stop arms extending from a corresponding one of said key levers and adapted to be moved from a normal to an actuated position by the actuation thereof, a reading shuttle disposed adjacent said banks of stop arms, a plurality of abutments on said shuttle, one for each stop arm bank, said stop arms and abutments being so arranged that (a) each abutment is engageable only with the stop arms in its corresponding bank, (b) like numbered stop arms in successive banks thereof when successively lowered are adapted to be engaged by their respective abutments to stop the shuttle in successive predetermined locations, and (c) said shuttle is stoppable by the cooperative action of said stop arms and abutments at a total number of locations equal to the number of key levers, each location being representative of a corresponding one of said keys and the character selectable by the operation thereof, a rotatable shaft to carry the matrix, drive means connected with said shuttle, means operatively connected with said drive means and controlled by actuation of a stop arm to energize said drive means to drive said shuttle in that direction enabling the corresponding abutment thereon to engage said actuated stop arm, and connecting means between said rotatable shaft and said shuttle whereby the photographic matrix is positioned at an exposure area to photograph that exposure character thereon corresponding to an actuated key lever.

10. The apparatus described in claim 9 and additionally including means for accurately positioning and locking each selected exposure character before said exposure area, comprising a locking member affixed to said matrix, a set of passages about the periphery of said member, movable means engageable with any of said passages for positioning said matrix in predetermined position, means connecting said movable means with said shuttle abutment whereby said movable means is actuated as said abutment engages said actuated stop arm, engages a passage positioned therebefore, and imparts positioning movement to said member to accurately position and lock said matrix with said exposure character at said exposure area.

11. The apparatus described in claim 10 wherein said locking member is a segment of a disc, the movable means includes a plurality of solenoids, each operatively connected with a corresponding one of said abutments and operable as the corresponding abutment engages a stop arm engageable thereby, and a plurality of locking arms, each actuated by a corresponding one of said solenoids, said locking arms being so arranged about said member that they are adapted to move radially relative thereto to engage any passage aligned therewith.

12. In apparatus for photographically producing printed text, a set of character keys to select the characters to be photographed; a set of key levers, one connected with each character key and actuatable thereby, intermediate ones of said levers being uniformly spaced center-to-center from levers adjacent thereto by a first distance, a matrix having a first row of lower case exposure characters and a second row of upper case exposure characters thereon, said rows of characters corresponding to the lower and upper case characters selectable on said character keys; means to bodily shift said matrix to selectively position either of said rows to photograph the characters therein; automatic indexing apparatus to position for photographing that exposure character on said matrix corresponding to a depressed character key and the key lever actuated thereby, said apparatus comprising a shuttle, reversible drive means connected with said shuttle and energizable upon actuation of said key lever, means operatively connected with said drive means for determining the direction of shuttle travel upon actuation of said key lever, a set of stop arms, each depending from a respective key lever and interposable into the path of shuttle travel as its respective key lever is actuated, said stop arms being arranged into a plurality of stop arm banks and uniformly spaced in the direction of shuttle travel from stop arms adjacent thereto by a center-to-center distance equal to said first distance, a plurality of abutments on said shuttle, one for each stop arm bank and engageable only with the stop arms therein, a first shaft to carry said matrix, means constraining said first shaft to rotate as said shuttle moves, whereby actuation of a key lever lowers the stop arm depending therefrom, energizes said drive means, and moves said shuttle in that direction which enables the abutment thereon, corresponding to the stop arm bank wherein the lowered arm is located, to strike said lowered arm and approximately position a corresponding exposure character for photographing; and means to accurately position said exposure character for photographing, including a locking disc segment mounted on said shaft for movement therewith, said segment having notches about its periphery, a plurality of movable locking arms corresponding to the number of said abutments, each of said locking arms being engageable with the locking segment notch positioned therebefore, a plurality of motor means, each connected to a related one of said locking arms, an operative connection between each motor means and a corresponding one of said abutments, whereby that motor means is actuated which is operatively connected with the abutment engaging said lowered arm, thereby causing the locking arm connected thereto to engage a segment notch aligned therewith to lock said segment in place, and thus accurately position said exposure character for photographing.

13. The apparatus described in claim 12 wherein the stop arm banks are staggered and the shuttle abutments corresponding thereto are in related staggered order, and wherein said means for determining the direction of shuttle travel includes an electrical contact area on said shuttle to one side of each abutment, a passage area through said shuttle at the opposite end of each abutment, and a guideway below said shuttle, whereby contact by said lowered arm with the contact area adjacent to its corresponding abutment energizes said drive means to move said shuttle in a first direction, while contact by said lowered arm with said guideway energizes said drive means to drive said shuttle in a direction opposite to said first direction.

14. The apparatus described in claim 12 and additionally including mechanism to maintain a lowered stop arm in position until a selected character is photographed, comprising a locking plate having apertures therein through which a portion depending from each key lever may pass, a solenoid to move said locking plate, and means to energize said solenoid as said key lever is actuated, whereby said locking plate is shifted by said solenoid to engage the portion depending from said actuated key lever, thereby maintaining the stop arm depending from said actuated key lever in lowered position.

15. The apparatus described in claim 12 wherein the means constraining said first shaft to rotate as the shuttle moves includes a rack connected to said shuttle, a pinion engageable with said rack, a rotatable fixed-position shaft to carry said pinion, a free floating shaft, a spacer bar to maintain a set distance between the fixed-position shaft and the free floating shaft, a second spacer bar to maintain a set distance between the free floating shaft and said first shaft, means to drivably connect the fixed-position shaft with said free floating shaft, and means to drivably connect said free floating shaft with said first shaft.

16. The apparatus described in claim 12 characterized by the fact that the shuttle abutments are uniformly spaced in the direction of shuttle travel from adjacent abutments by a distance $D(s-1/n)$ units, where D is the center-to-center distance in the direction of shuttle travel between adjacent stop arms, $s$ is the number of stop arms in a bank thereof, and $n$ is the number of banks of stop arms.

17. A keyboard reading mechanism for selectively positioning a carrier having a complete set of characters corresponding to the characters selectable on a typewriter keyboard, whereby each time a keyboard character key is operated a corresponding carrier character is selectively positioned, comprising a movable member disposed beneath the typewriter character keys; a guideway for said member; a series of spaced stops, one depending from each character key and actuatable thereby into the path of said member to limit the travel thereof, each stop and the location thereof being related to a corresponding carrier character and to the position thereof on said carrier; means to impart selective movement to said member in either of opposed directions upon operation of a character key; means operatively connected with said latter means to determine the direction of member movement, whereby said member travels in that direction which enables the stop depending from said operated character key to arrest member movement; means constraining said carrier to move as said member moves, said latter means including a link connected with said carrier and arranged with said member for movement relative thereto, stop means on said member limiting said relative movement, yieldable apparatus anchored between said link and said member, stressable upon relative movement between said member and said link as said member travels towards said actuated stop, having no effect to move said carrier until stressed and until said member travel is arrested by said actuated stop, and thereafter effective to move said carrier a distance proportional to the thickness of said actuated stop; and means to limit the effectiveness of said yieldable apparatus, whereby that carrier character corresponding to the actuated stop is selectively and accurately positioned regardless of the direction from which said member approaches said actuated stop.

18. Indexing apparatus for use with a typewriter having a set of character keys, and a set of uniformly spaced key levers, each key lever being actuatable by a corresponding one of said character keys, comprising a photographic font having a set of exposure characters thereon corresponding to those selectable by operation of said keys, a reading shuttle to automatically determine which key lever is actuated, drive means to move said shuttle, means connecting said shuttle with said font whereby said font is selectively positioned as said shuttle is moved, a set of stop pins, each depending directly below a corresponding key lever, normally spaced above said shuttle, and adapted to be positioned in the path of shuttle travel as the corresponding key lever is actuated to stop said shuttle at a predetermined location corresponding to the actuated key lever, means operatively connected with said drive means to energize said drive means and to determine the direction in which said shuttle travels upon said key lever being actuated so that said shuttle is driven in that direction which enables the stop pin depending from said actuated key lever to arrest shuttle travel, a link connected with said font and mounted for movement relative to said shuttle, means on said shuttle limiting said relative movement, yieldable means anchored between said link and said shuttle, stressed as said shuttle travels relative to said link and towards said stop pin, and effective after said shuttle is arrested by said stop pin to cause further movement of said font independent of said shuttle, thereby accurately positioning that font exposure character for photographing corresponding to said actuated key lever, and means on said shuttle limiting the effectiveness of said yieldable means.

19. A motion compensator to adjustably position a type font after movement of a shiftable positioning member is arrested by a first stop, whereby said font is stopped in the same position regardless of the direction from which said member approaches said first stop, comprising: a bar between said font and said member, said bar being mounted on said member for movement relative thereto and connected with said font, an arm carried by said bar, limiting means on said member, one on each side of said arm and engageable therewith to limit relative movement between said bar and said member, a pair of opposed springs anchored to said member and acting on said arm to releasably maintain it equidistant between the limit means, the distance between said arm, when it is so positioned and each limit means being proportional to the width of said first stop, and a centering stop to limit the effectiveness of said springs, whereby travel of said member causes said arm to move toward one of said limit means to be engaged thereby, stresses one of said springs, and moves said font, and arrest of said member by said first stop permits the stressed spring to act on said arm and move said bar and said font independently of said member, said independent movement continuing until the centering stop again limits the effectiveness of said stressed spring.

20. Automatic indexing apparatus controlled by a typewriter having a set of character key levers, said apparatus being adapted to position a font having exposure characters thereon, each of said exposure characters corresponding to a related one of said key levers, whereby an exposure character on the font is positioned for photographing each time a corresponding character key lever is operated, comprising a shuttle disposed beneath said key levers, stop means controlled by said key levers to arrest shuttle travel at any one of a plurality of predetermined locations, each one of said locations representing a corresponding one of said character key levers and the exposure character related thereto, reversible drive means connected with said shuttle, means connected with said drive means to determine the direction of shuttle travel and to actuate said drive means upon operation of a character key lever, whereby said shuttle travels in that direction which enables said stop means to arrest shuttle travel at a predetermined location corresponding to said operated character key lever, means to carry the font, and a motion transmission train connecting said latter means with said shuttle, said train including a link connected with said latter means and mounted for movement relative to said shuttle, means on said shuttle limiting said relative movement, yieldable means anchored between said link and said shuttle, stressable upon relative movement therebetween, having no effect to move said latter means and said font until stressed and until travel of said shuttle is arrested, said yieldable means subsequently being operative to impart differential movement to said latter means and said font independent of said shuttle, means on said shuttle limiting the operative effect of said yieldable means, whereby accurate alignment, at a photographic area, of the exposure character corresponding to said operated key lever is achieved.

21. Automatic indexing apparatus controlled by a typewriter having a set of character key levers, said apparatus being adapted to position a font having exposure characters thereon, each of said exposure characters corresponding to a related one of said key levers, whereby an exposure character on the font is positioned for photographing each time a corresponding character key lever is operated, comprising a shuttle disposed beneath said key levers, stop means controlled by said key levers to arrest shuttle travel at any one of a plurality of predetermined locations, each one of said locations representing a corresponding one of said character key levers and the exposure character related thereto, reversible drive means connected with said shuttle, means connected with said drive means to determine the direction of shuttle travel and to actuate said drive means upon operation of a character key lever, whereby said shuttle travels in that predetermined direction which enables said stop means to arrest shuttle travel at a predetermined location corresponding to said operated character key lever, means on said shuttle to engage said stop means and arrest shuttle movement, a carrier for said font, means connecting said carrier with said shuttle whereby said carrier is positionable at any one of a plurality of predetermined locations, a locking member mounted to said carrier for movement therewith, said member having a set of locking passages arranged at its peripheral edge, movable locking means engageable in any one of said passages to accurately position and lock said carrier and said font for photographing the character corresponding to said operated character key lever, motor means to move said locking means, and means operatively connecting the motor means to the means on said shuttle, whereby said motor means is actuated to initiate the carrier locking action after the means on said shuttle engages said stop means.

22. The indexing apparatus of claim 21 characterized by the fact that positioning of said character for photographing is independent of the direction in which said shuttle travels, said connecting means including a bar operatively connected with said carrier and mounted on said shuttle for movement relative thereto, a pair of stops on said shuttle limiting said relative movement, the distance between said pair of stops being proportional to the sum of the thickness of said stop means and the means on said shuttle, an arm carried by said bar, spring means anchored on said shuttle and acting on said arm, a third stop on said shuttle limiting the effect of said spring means to releasably maintain said arm equidistant between said pair of stops, whereby, during the travel of said shuttle in a predetermined direction and relative to said bar, said spring means is stressed, said spring means being effective to move said bar and said carrier independently of said shuttle, subsequent to said shuttle being stopped, until said third stop limits said independent movement.

23. In apparatus for photographically producing printed text, a set of character keys to select the characters to be photographed; a set of key levers, one connected with each character key and actuatable thereby, intermediate ones of said levers being uniformly spaced center-to-center from levers adjacent thereto by a first distance, a matrix having a first row of lower case exposure characters and a second row of upper case exposure characters thereon, said rows of characters corresponding to the lower and upper case characters selectable on said character keys; means to shift said matrix bodily to position either of said rows to photograph the characters therein; automatic indexing apparatus to position, for photographing, that exposure character on said matrix corresponding to a depressed character key and to the key lever actuated thereby, said apparatus comprising a shuttle, reversible drive means connected with said shuttle and energizable upon actuation of said key lever, means operatively connected with said drive means for determining the direction of shuttle travel upon actuation of said key lever, a set of stop arms, each depending from a respective key lever and interposable into the path of shuttle travel as its respective key lever is actuated, said stop arms being arranged into a plurality of stop arm banks and each being uniformly spaced in the direction of shuttle travel from stop arms adjacent thereto by a center-to-center distance equal to said first distance, a plurality of abutments on said shuttle, one for each stop arm bank and engageable only with the stop arms therein, a shaft to carry said matrix, a motion translating train connecting said shuttle and said shaft to convert linear shuttle movement into rotary shaft movement, said train including a bar effectively connected with said shaft and mounted to said shuttle for movement relative thereto, a pair of stops on said shuttle limiting said relative movement in either direction, the distance between said pair of stops being proportional to the thickness of said stop arms, a protrusion on said bar, spring means anchored on said shuttle and acting on said protrusion, a third stop on said shuttle limiting the effect of said spring means and releasably maintaining said protrusion equidistant between said pair of stops, whereby actuation of a key lever lowers the stop arm depending therefrom, energizes said drive means, causing said bar and said shuttle to experience relative movement to stress said spring means, and moves said shuttle in that direction which enables the abutment thereon, corresponding to the stop bank wherein the lowered arm is located, to engage said lowered arm and approximately position a corresponding exposure character for photographing said spring means thereafter being effective to move said bar independently of said shuttle until said third stop limits said independent movement, thereby accurately positioning said exposure character.

24. The apparatus described in claim 9 characterized by the fact that positioning of said exposure character for photographing is accurately achieved regardless of the direction from which said shuttle and the corresponding abutment thereon approach said lowered stop arm, said connecting means including a motion translating train connected with said shaft to convert linear movement into rotary shaft movement, a linearly moveable link connected with said train and mounted on said shuttle for movement relative thereto, means on said shuttle limiting said relative movement, spring means anchored between said link and said shuttle, said spring means being stressable upon relative movement between said shuttle and said link and as said abutment travels towards said stop arm, and effective after said abutment strikes said stop arm to cause movement of said link independently of said shuttle, thereby further driving said train and said shaft, and a stop on said shuttle limiting the effective drive of said spring means.

25. In combination, a power driven shuttle movable along a given path, a plurality of stop arms interposable into said path, a keyboard, each key thereof being arranged to actuate a stop arm representative thereof to arrest shuttle travel at a predetermined location, said stop arms being arranged in a plurality of staggered banks, a plurality of abutments on said shuttle, said abutments being arranged in corresponding staggered order, one for each stop arm bank, and engageable only with the stop arms therein when successively actuated, corresponding stop arms in successive banks thereof being adapted to be engaged by their respective abutments to stop said shuttle in successive predetermined locations which differ according to the stop-arm bank containing the actuated stop arm and according to the location identity of the actuated stop arm within its stop-arm bank, a matrix carrier, and means interconnecting said carrier and said shuttle for correlated key-controlled movement, whereby said carrier selectively positions its matrix to correspond to any actuated key.

26. Automatic indexing apparatus for use with a keyboard having a set of independently operable character keys for selecting characters for photographic reproduction, and a carrier for a matrix having exposure characters thereon corresponding to those selectable on said keys, comprising: a power driven shuttle connected with said carrier to effect movement thereof; a plurality of stop arms, arranged in a plurality of banks, with one stop arm associated with each key and interposable by the operation thereof into the path of shuttle travel, said shuttle thereby being arrestable at a plurality of predetermined locations respectively of said keys; a plurality of abutments on said shuttle, one for each stop arm bank, said stop arms and said abutments being so located relative to each other in directions laterally of said path of shuttle travel that each abutment is engageable only with the stop arms in its corresponding bank to arrest shuttle travel, each of said abutments being spaced along the shuttle a different effective distance from the stop arms in its associated stop-arm bank, when successively interposed corresponding stop arms in the respective banks being adapted to be engaged by their respective abutments to stop said shuttle in respective ones of said predetermined locations.

27. Automatic indexing apparatus for use with a keyboard having a set of independently operable character keys for selecting characters for reproduction, comprising: a carrier for a font having characters thereon corresponding to those selectable on said keys, a power driven shuttle, a plurality of stop arms, one for each key, connected therewith, and interposable by the operation thereof into the path of shuttle travel, said shuttle thereby being arrestable at a plurality of predetermined locations, each location corresponding to a respective one of said keys and the character selectable thereby, said stop arms being arranged in a plurality of banks, a plurality of abutments on said shuttle, one for each stop arm bank, said stop arms and said abutments being so arranged that each abutment is engageable only with the stop arms in its corresponding bank, and, when successively lowered, corresponding stop arms in successive banks are adapted to be engaged by their respective abutments to stop said shuttle in successive ones of said predetermined locations, and means connecting said shuttle with said carrier including a link effectively connected with said carrier and mounted for movement relative to said shuttle, spring means anchored between said link and said shuttle and stressed upon relative movement therebetween and as said shuttle travels, means on said shuttle limiting the stress of said spring means, said spring means, subsequent to being stressed and the travel of said shuttle being arrested by a stop arm, being effective to drive said link and said carrier independently of said shuttle, and means on said shuttle limiting the effective drive of said spring means.

28. Apparatus for selecting and positioning characters for reproduction at a character-reproduction position, comprising a matrix having characters dispersed thereon in respective positions for selective reproduction, with the characters comprising adjacent groups of characters, means for selecting the characters in succession, group-locating and character-locating means, group-selecting means responsive to the selection of any character in any said character group for operating the group-locating means in accordance with the location on the matrix of the character group containing the selected character, means responsive to the operation of the group-locating means for imparting a positioning movement to the matrix which brings the character group containing the selected character into association with the character-reproduction position to the exclusion of any other character group, character-selecting means also responsive to the selection of the last said any character for operating the character-locating means in accordance with the location on the matrix of the selected character within its character group, and means responsive to the operation of the character-locating means for modifying said positioning movement to bring the selected character into association with the character-reproduction position to the exclusion of any other character in its character group.

29. Apparatus as described in claim 28, wherein said character-locating means comprises a group of matrix-locking devices common to the said character groups and corresponding respectively to the characters in any character group, the matrix-locking devices being individually operable by said character-selecting means, any operated matrix-locking device further including means for imparting any final positioning movement to the matrix which may be necessary accurately to align the selected character within the said character-reproduction position and for holding the matrix locked in that final aligned position.

30. Apparatus as described in claim 28, wherein said character-locating means includes means for effectively altering the position of the said group-locating means in accordance with the location of the selected character within its character group.

31. Apparatus as described in claim 28, wherein the said characters on the matrix comprise a first set, the matrix having a second set of characters thereon dispersed in positions displaced from but corresponding respectively to those of the characters of the first set, a shift device and means for operating it to select either set of characters to the exclusion of the other, and means, responsive to the shift device having been operated to select the second set of characters when a character is selected, for so altering said responsive movement of the matrix that the corresponding character in the second set is thereby brought into association with said character-reproduction position.

References Cited in the file of this patent
UNITED STATES PATENTS 2,207,265   Ogden _________________ July 9, 1940